United States Patent
Caponetti et al.

(10) Patent No.: US 10,890,159 B2
(45) Date of Patent: Jan. 12, 2021

(54) DYNAMIC CONTROLLED WIND TURBINE SHUTDOWN

(71) Applicant: VESTAS WIND SYSTEMS A/S, Aarhus (DK)

(72) Inventors: Fabio Caponetti, Åbyhøj (DK); Keld Hammerum, Hadsten (DK); Jesper Lykkegaard Neubauer, Hornslet (DK)

(73) Assignee: VESTAS WIND SYSTEMS A/S, Aarhus (DK)

( * ) Notice: Subject to any disclaimer, the term of this patent is extended or adjusted under 35 U.S.C. 154(b) by 0 days.

(21) Appl. No.: 16/326,301

(22) PCT Filed: Aug. 14, 2017

(86) PCT No.: PCT/DK2017/050262
§ 371 (c)(1),
(2) Date: Feb. 18, 2019

(87) PCT Pub. No.: WO2018/033190
PCT Pub. Date: Feb. 22, 2018

(65) Prior Publication Data
US 2019/0203692 A1    Jul. 4, 2019

(30) Foreign Application Priority Data
Aug. 17, 2016 (DK) .................. 2016 70629

(51) Int. Cl.
*F03D 7/02* (2006.01)
*F03D 7/04* (2006.01)

(52) U.S. Cl.
CPC ......... *F03D 7/0264* (2013.01); *F03D 7/0224* (2013.01); *F03D 7/0276* (2013.01);
(Continued)

(58) Field of Classification Search
CPC .... F03D 7/0224; F03D 7/0276; F03D 7/0296; F03D 7/043; F03D 7/0264;
(Continued)

(56) References Cited

U.S. PATENT DOCUMENTS

| 4,189,648 A | 2/1980 | Harner |
| 4,193,005 A * | 3/1980 | Kos .......................... H02P 9/04 |
| | | 290/44 |

(Continued)

FOREIGN PATENT DOCUMENTS

| CN | 102384031 A | 3/2012 |
| EP | 1738237 A2 | 5/2007 |

(Continued)

OTHER PUBLICATIONS

PCT Written Opinion of the International Searchingt Authority for Application No. PCT/DK2017/050262 dated Mar. 11, 2017.
(Continued)

*Primary Examiner* — Charles Reid, Jr.
(74) *Attorney, Agent, or Firm* — Patterson + Sheridan, LLP

(57) ABSTRACT

A method is provided for controlling the shutdown of a wind turbine of the type having a rotor, the rotor including one or more wind turbine blades. The method includes dynamically determining a rotor speed reference; obtaining a measure of the rotor speed of the rotor; determining an error between the rotor speed reference and the rotor speed of the rotor; and controlling a pitch of one or more of the wind turbine blades based on the determined error. A corresponding wind turbine controller and a wind turbine including such a controller are also provided.

15 Claims, 4 Drawing Sheets

(52) U.S. Cl.
CPC .......... *F03D 7/0296* (2013.01); *F03D 7/043* (2013.01); *F05B 2270/309* (2013.01); *F05B 2270/327* (2013.01); *F05B 2270/334* (2013.01); *Y02E 10/72* (2013.01)

(58) Field of Classification Search
CPC .......... F05B 2270/309; F05B 2270/327; F05B 2270/334; Y02E 10/723
USPC ...................................................... 290/44, 55
See application file for complete search history.

(56) References Cited

U.S. PATENT DOCUMENTS

| | | | |
|---|---|---|---|
| 2009/0224543 A1 | 9/2009 | Steudel et al. | |
| 2009/0250932 A1* | 10/2009 | Egedal | F03D 7/0224 290/44 |
| 2011/0084485 A1 | 4/2011 | Miranda et al. | |
| 2012/0139240 A1 | 6/2012 | Otamendi Claramunt et al. | |
| 2013/0214535 A1* | 8/2013 | Brath | F03D 7/045 290/44 |
| 2014/0297052 A1* | 10/2014 | Pineda Amo | F03D 7/042 700/287 |
| 2014/0334927 A1* | 11/2014 | Hammerum | F03D 7/0224 416/1 |
| 2015/0110596 A1* | 4/2015 | Huang | F03D 17/00 415/1 |
| 2015/0377215 A1 | 12/2015 | Agarwal et al. | |

FOREIGN PATENT DOCUMENTS

| | | |
|---|---|---|
| EP | 2107236 A1 | 10/2009 |
| EP | 2746576 A2 | 6/2014 |
| EP | 2784303 A1 | 10/2014 |
| WO | 2014173417 A1 | 10/2014 |
| WO | 2018033190 A1 | 2/2018 |

OTHER PUBLICATIONS

PCT International Search Report for Application No. PCT/DK2017/050262 dated Mar. 11, 2017.

Danish Patent and Trademark Office First Technical Examination Report for Appliation No. PA 2016 70629 dated Feb. 21, 2017.

Chinese Office Action for Application 201780064119.7 dated Mar. 19, 2020.

* cited by examiner

DYNAMIC CONTROLLED WIND TURBINE SHUTDOWN

Embodiments of the present invention relate to methods and control systems for controlling the shutdown of a wind turbine, in particular to controlling the wind turbine shutdown in a dynamic and adaptive manner.

FIG. 1 illustrates a large wind turbine 1, comprising a tower 10, a wind turbine nacelle 20 positioned on top of the tower 10 and a rotor. The illustrated wind turbine rotor comprises three wind turbine blades 32 and a hub 34. The hub 34 is located at a height H above the base of the tower and each of the three wind turbine blades 32 are mounted to the hub. Whilst the wind turbine rotor is shown as having three wind turbine blades, the wind turbine rotor could comprise a different number of blades 32. The blades 32 each have a length L.

The hub 34 is typically connected to the nacelle 20 through a low speed shaft (not shown) extending from the front of the nacelle 20. The low speed shaft drives a gearbox (also not shown) which steps up the rotational speed and, in turn, drives an electrical generator within the nacelle 20 for converting the energy extracted from the wind by the rotating blades 32 into electrical power output. In some embodiments, the wind turbine rotor may be directly coupled to the electrical generator, i.e. direct-drive turbines.

The wind turbine blades 32 define a swept area A, which is the area of a circle delineated by the rotating blades 32. The swept area dictates how much of a given air mass is intercepted by the wind turbine 1 and, thus, influences the power output of the wind turbine 1 and the forces and bending moments experienced by the components of the turbine 1 during operation. The turbine may stand onshore, as illustrated, or offshore. In the latter case the tower will be connected to a monopile, tripod, lattice or other foundation structure, and the foundation could be either fixed or floating.

Each wind turbine has a wind turbine controller that processes inputs from sensors and other control systems and generates output signals for actuators such as blade pitch actuators, generator torque controller, generator contactors, and yaw motors etc. The output signals generated by the wind turbine controller regulate the operation of the wind turbine 1.

If the wind turbine controller receives an instruction or a request for the wind turbine to be shut down, then the wind turbine controller may generate output signals that cause the speed of the wind turbine rotor to decrease to zero. For example, the wind turbine controller may cause the blade pitch angle to be increased (towards 90 degrees) using the blade pitch actuators. This is commonly known as pitching the blade out, which causes the power output to be reduced since the pitched blade acts as an aerodynamic brake.

A shutdown procedure may be initiated to change the wind turbine 1 from an operational state to a static state, where the wind turbine rotor is stationary. The shutdown procedure may be initiated in order to avoid excessive loads on the components of the wind turbine 1, for example during extreme wind conditions and/or if the electric generator of the wind turbine 1 has been disconnected from the power grid. The combination of these two events is typically the worst case scenario for the loading of a wind turbine during a shutdown procedure.

Existing control techniques tend to implement wind turbine shutdown in a process whereby the wind turbine blades are pitched out towards a feathered position at a predetermined blade pitch change speed until the wind turbine blade is fully turned out of the wind to reduce power output, this may also take into account specific pitch angles of the individual blades. It has been appreciated that it would be desirable to provide an improved method and system for controlling the shutdown of a wind turbine that reduces the stresses induced by excessive loads on the wind turbine components.

SUMMARY OF THE INVENTION

The invention is defined in the independent claims to which reference is now directed. Different embodiments are defined in the dependent claims.

Embodiments of the invention relate generally to methods for controlling the operating parameters of a wind turbine during shutdown, controllers for implementing such methods and wind turbines including one or more of these controllers. In particular, it has been appreciated that certain loads experienced during the shutdown of a wind turbine can be reduced by providing improved control of the pitching of the blades of a wind turbine. This may reduce the required strength of the turbine elements or components, or alternatively may increase the expected lifetime of the relevant components.

According to a first aspect of the invention, there is provided a method of controlling shutdown of a wind turbine having a rotor, the rotor comprising one or more wind turbine blades, the method comprising: dynamically determining a rotor speed reference; obtaining a measure of the rotor speed of the rotor; obtaining a measure of a fore-aft movement of the wind turbine tower; determining an error between the rotor speed reference and the rotor speed of the rotor; and controlling a pitch of one or more of the wind turbine blades based on the determined error and the measured fore-aft movement of the wind turbine tower.

By controlling the blade pitch using a reference rotor speed that is dynamically determined, rotor loading can be reduced quickly and efficiently in view of the current conditions that the wind turbine is subject to; in an embodiment this may be obtained by closed feedback loop control. This in turn reduces the extreme loading that the wind turbine would be expected to experience during the controlled shutdown, which may be taken into account when considering the design loads at the design stage of producing the wind turbine, and improve the safety of the wind turbine, in particular with reference to the stresses on the drivetrain and gearbox components.

Moreover, the method comprises obtaining a measure of a fore-aft movement of the wind turbine tower, and controlling the pitch of one or more of the wind turbine blades in further dependence on the measured fore-aft movement of the wind turbine tower. During shutdown the turbine is prone to fore-aft movement, and by taking this movement into account during the shutdown the loading that the wind turbine tower experiences due to the fore-aft movement is directly taken into account, and thereby ensuring quickly and efficiently shutdown and at the same time keeping the loads of the tower structure and/or tower foundation down.

Optionally, the method may further comprise determining whether the rotor speed of the rotor is increasing, wherein the dynamic determination of the rotor speed reference comprises maintaining a constant rotor speed reference value when the rotor speed of the rotor is determined to be increasing. This improves the control of the pitch actuation when the error between the rotor speed reference and the measured rotor speed of the rotor is large by controlling the rotor speed reference to reduce the time taken for the method to regain control of the speed of the rotor. In this manner, the rotor speed reference may be dynamically determined because it is determined at least in part based on an evaluation of the rotor speed of the rotor.

Optionally, the dynamic determination of the rotor speed reference may comprise setting the rotor speed reference value to be equal to the rotor speed of the rotor when the rotor speed of the rotor is determined to be less than the rotor speed reference. This acts to stop the method from attempting to increase the rotor speed of the rotor where the wind turbine blades are naturally slowing down more quickly than the dynamically determined reduction of the rotor speed reference value.

Optionally, the dynamic determination of the rotor speed reference may comprise progressively ramping the rotor speed reference down to zero when the rotor speed of the rotor is determined to be both higher than the rotor speed reference and to not be increasing. This advantageously reduces the speed of the rotor to zero when the error between the rotor speed reference and the measured rotor speed is not too large and thus when the method has control of the speed of the rotor.

Optionally, a rate of change of the wind turbine blade pitch may be reduced whilst the wind turbine tower is determined to be moving into the wind due to the fore-aft movement and/or wherein the rate of change of the wind turbine blade pitch is increased whilst the wind turbine tower is determined to be moving in the direction of the wind due to the fore-aft movement.

In this manner, the wind loading on the wind turbine blades may be maintained whilst the tower is moving forwards by either not pitching the wind turbine blade out any further, or by reducing the speed at which the wind turbine blade is pitched out. This change in the pitching out of the wind turbine blade will provide a comparatively large wind loading and wind resistance on the wind turbine blades that will act to counter the motion of the wind turbine into the wind. Conversely, the wind loading on the wind turbine blades may be reduced whilst the tower is moving backwards, i.e. in the wind direction, by increasing the speed at which the wind turbine blades are pitched out and moved towards the feathered position. This will reduce the wind loading that would otherwise contribute to the speed of the aft movement of the wind turbine tower and thus would increase or sustain the tower oscillations in the plane parallel to the wind direction.

Optionally, the dynamic determining of the rotor speed reference may further comprise modifying the rotor speed reference based on the measured fore-aft movement of the wind turbine tower. In such a method, the contribution to the control of the wind turbine blade pitching in view of the fore-aft movement of the wind turbine tower may be included in the control method by simply modifying the dynamically determined rotor speed reference.

Optionally, the method may further comprise determining an acceleration of the rotor based on the rotor speed of the rotor; wherein a rate of change of the wind turbine blade pitch is increased proportional to the acceleration when the acceleration is above a given threshold. Accordingly, the level of wear and fatigue experienced by the drivetrain and gearbox components during shutdown of the wind turbine may be limited.

Optionally, a gain reduction may be applied to a rate of change of the wind turbine blade pitch as a function of the pitch of the one or more wind turbine blades. This enables the use of a single nominal tuning that can then be automatically scaled to fit the various possible operating points of the turbine. In this context, an operating point may be defined by one or more measured quantities, for example the average wind speed, rotor speed, pitch angle or electrical power of the wind turbine.

Optionally, the gain reduction may be a progressive gain reduction and a rate of the progressive gain reduction may be based on one or more threshold angles of the pitch of one or more of the wind turbine blades so that the rate of pitch change may be altered as the blade moves towards the feathered position.

Optionally, the method may apply no gain reduction if the pitch is below a first threshold angle, a first rate of progressive gain reduction may be applied if the pitch is between the first threshold angle and a second threshold angle and a second rate of progressive gain reduction may be applied if the pitch is above the second threshold angle; wherein the first rate of progressive gain reduction is higher than the second rate of progressive gain reduction. In this manner, the rate of the blade pitch change may be reduced as the blade moves towards the feathered position, with the loads on the system being minimised throughout the shutdown process.

Optionally, the pitch of each of the one or more wind turbine blades may be controlled individually. This enables rotor blade loads to be compensated for where there may be uneven loading on the rotor, for example the tilt and yaw moments at the main bearing of the wind turbine nacelle. This active control during wind turbine shutdown acts to prevent structural failure of the main components due to extreme loads and would also enable shutdown of the wind turbine when the blades are pitched at different positions.

According to a second aspect of the invention, there may also be provided a controller for a wind turbine having a rotor, the rotor comprising one or more wind turbine blades, wherein the controller is configured to implement any of the above methods for controlling wind turbine shutdown. Such a controller will enable the blade pitch to be controlled based on a closed feedback loop control with a reference rotor speed that is dynamically determined so that rotor loading can be reduced quickly and efficiently in view of the current conditions that the wind turbine is subject to. This controller will act to reduce the extreme loading that the wind turbine may be expected to experience during the controlled shutdown. This can then be taken into account when considering the design loads at the design stage of producing the wind turbine and can improve the safety of the wind turbine.

Optionally, the controller may be configured to cause any of the above methods to be implemented in response to the controller receiving an emergency shutdown request. The emergency shutdown request may indicate, for example, that a failure has been detected in the controller and accordingly the shutdown methods may be tuned for the loads that would be expected to be experienced during such an emergency shutdown operation.

According to a third aspect of the invention, there may be provided a wind turbine comprising a rotor and one or more controllers according to the second aspect of the invention, wherein the rotor comprises one or more wind turbine blades. The controller may be included in a wind turbine. Where a single wind turbine comprises a plurality of controllers, the controllers may provide redundancy in the operation and control of the wind turbine during shutdown, for example in the event that one of the controllers fails.

Optionally, a wind turbine according to the third aspect of the invention may comprise one or more controllers each configured to control the pitch of a respective wind turbine blade of the one or more of the wind turbine blades. In this manner each controller may provide pitch control for a different blade so that the pitching of the wind turbine blades may be controlled individually and independently. This enables rotor blade fatigue loads to be compensated for where there may be uneven loading on the rotor, for example the tilt and yaw moments at the main bearing of the wind turbine nacelle.

According to a fourth aspect of the invention, there may also be provided a corresponding computer program that when executed on a wind turbine controller causes the wind turbine controller to carry out any of the methods described herein.

BRIEF DESCRIPTION OF THE DRAWINGS

The invention will now be further described by way of example only and with reference to the accompanying figures in which.

DETAILED DESCRIPTION OF PREFERRED EMBODIMENTS

The process of shutting down a wind turbine 1 will not always take place in steady wind conditions and accordingly the method of the control system is preferably able to safely shut the wind turbine down in less favourable conditions, and even extreme conditions. For example, it is desirable that the method of controlling the shutdown of the wind turbine 1 be able to quickly and safely stop the rotation of the wind turbine rotor, even in gusty conditions.

One example of such gusty conditions is commonly known as a Mexican hat wind gust for its similarity to the cross-section of a sombrero. In this type of wind gust, the steady wind speed drops briefly to a low, then quickly accelerates to a peak level before dropping again to a low and then recovering to the steady wind speed. The electric generator of the wind turbine 1 may be disconnected from the power grid if there is an electrical failure or simply a lack of demand; however, this disconnection removes the counter torque of the electric generator from the wind turbine rotor. This reduces the resistance to the rotation of the rotor and thus allows the speed of the rotor to increase further.

If an existing wind turbine shutdown procedure, of the type described in the above background, were to be initiated whilst the speed of the rotor was increasing in this manner, then the pitching of the wind turbine blades 32 would not be in control of the wind turbine rotor speed. This would mean that the shutdown of the wind turbine could not be adapted to minimise the loads experienced by the wind turbine 1. Furthermore, whilst simply pitching the wind turbine blades out as fast as possible may quickly reduce the rotation of the wind turbine rotor, the sudden change in pitch will also unbalance the wind turbine with respect to the wind loading on the wind turbine, which may cause the wind turbine to move forwards (i.e. into and against the wind direction) and backwards (i.e. out of and with the wind direction). This fore-aft oscillation of the wind turbine will cause undesirable stresses in the wind turbine tower 10.

Figure 1:
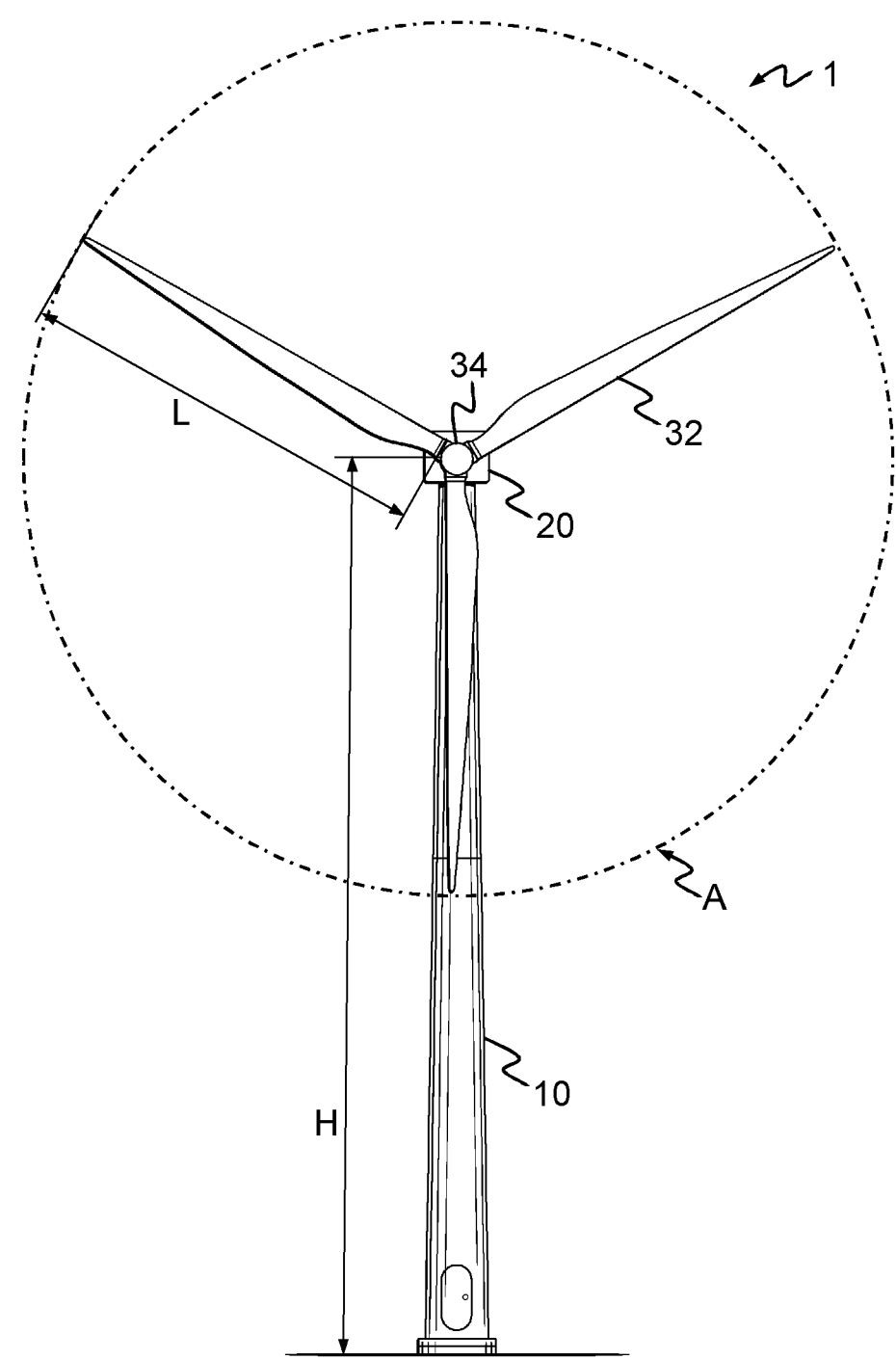
FIG. 1 is a schematic view of a wind turbine.
Figure 2:
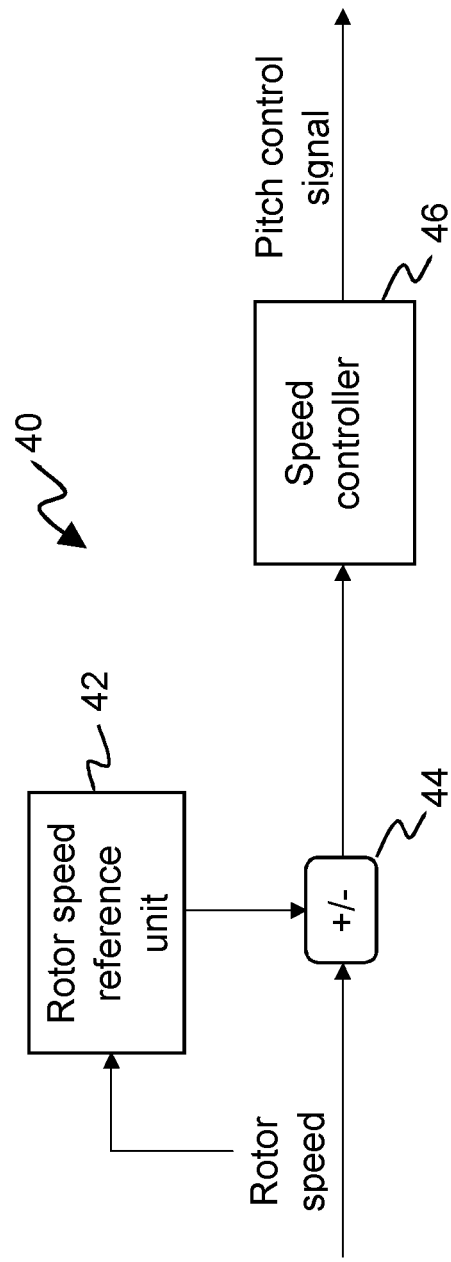
FIG. 2 is an example of a controller according to a first example of the invention.

In the present invention, the wind turbine shutdown procedure is advantageously completed under a closed loop feedback control system. FIG. 2 illustrates a control system that may be implemented in a wind turbine controller for controlling the shutdown of a wind turbine according to a general embodiment of the invention. The wind turbine controller 40 comprises a rotor speed reference unit 42, an error value controller 44 and a speed controller 46. The wind turbine controller 40 is preferably local to the wind turbine 1, for example in the tower 10 or in the nacelle 20, this reduces the possibility of communication issues preventing the controller from being able to cause the wind turbine 1 to perform a controlled shutdown. However, it will be appreciated that the wind turbine controller 40 may be located elsewhere.

When the controller 40 receives a signal instructing the controller to initiate a shutdown procedure, the rotor speed reference unit 42 will generate an initial rotor speed reference value. The rotor speed reference unit 42 receives a measure of the rotor speed of the wind turbine rotor and uses this measure as an input for dynamically determining a rotor speed reference value. It will be appreciated that the measure of the rotor speed may be obtained by integration of the output of a sensor that measures the acceleration of the rotor.

The initial rotor speed reference value may be set to be equal to the measured rotor speed of the wind turbine rotor, to a filtered version of the measured rotor speed of the wind turbine rotor, or alternatively it may be set to the value of a target rotor speed that was in operation immediately prior to the controller 40 receiving a shutdown instruction. This rotor speed reference value is then communicated to the error value controller 44, which also receives the measure of the rotor speed of the wind turbine rotor. The error value controller 44 compares these two inputs to calculate an error between the rotor speed reference and the rotor speed of the wind turbine rotor.

The error value controller 44 is preferably a proportional integral derivative (PID) controller, whereby the proportional term accounts for the current error value, the integral term accounts for the previous error values and the derivative term looks forward to possible future values. However, the parameters of the PID controller may optionally be set such that the one or two of the proportional, integral or derivative terms are set to zero.

The determined error is then communicated to the speed controller 46, which produces a pitch control signal for controlling the pitch of the wind turbine blades 32 based on the determined error. If the initial rotor speed reference value is set to be equal to the measured rotor speed of the wind turbine rotor at the first instance then there will initially be no determined error and accordingly the speed controller 46 will not initially cause the pitch of the wind turbine blades 32 to change. The rotor speed reference unit 42 will then continuously generate new rotor speed reference values for use in the controller 40 to produce pitch control signals that quickly and safely transition the wind turbine 1 from an operational state to a shutdown state where the wind turbine rotor is static and the pitch angle of the wind turbine blades 32 has been increased to an angle of roughly 90 degrees, i.e. the feathered position.

The rotor speed reference value is dynamically determined in the sense that it is determined based on measured parameters of the wind turbine (for example rotor speed) and/or measured parameters of the external conditions (for example wind speed). This enables the controller 40 to modify the wind turbine shutdown procedure in order to maintain control of the rotor speed and minimise the loads experienced by the wind turbine 1.

In one example of dynamically determining the rotor speed reference value, the rotor speed reference unit 42 monitors the rotor speed input to determine if the speed of the rotor is increasing or not. In this example, if it is determined that the rotor speed is increasing, then the rotor speed reference unit 42 adapts the existing continuous generation of new rotor speed reference values to hold the rotor speed reference constant.

Whilst it may seem counterintuitive to prevent the rotor speed reference value from decreasing while the controller is attempting to reduce the speed of the rotor to zero, continuing to reduce the rotor speed reference in this scenario would cause the determined error to become comparatively large. This in turn would cause the speed controller 46 to attempt to change the pitch of the wind turbine blades 32 by a large amount and/or quickly, which is undesirable since it may cause undue stresses on the pitch actuation system and/or cause the wind turbine tower 10 to oscillate due to the rapid change in the wind loading of the wind turbine blades 32. As such, there is a trade-off between the stresses induced in the rotor and the stresses induced in the tower during the shutdown procedure.

Moreover, a large error value such as this would indicate that the control system is not actually performing the shutdown in a controlled manner. Accordingly, by holding the rotor speed reference value constant, the error is prevented from becoming too large and control of the shutdown process is sustained. The controller 40 maintains this constant rotor speed reference until it is determined that the rotor speed of the rotor is no longer increasing. However, it is important to note that the speed controller 46 will continue to pitch the wind turbine blades 32 out whilst the rotor speed reference value is held constant since the measured rotor speed will still be higher and increasing.

When it is determined that the rotor speed of the rotor is no longer increasing, the rotor speed reference value may be reduced by the continuous generation of new rotor speed reference values, for example the rotor speed reference may be progressively ramped from the previous value to zero in a linear or non-linear manner.

Alternatively or additionally, a further example of dynamically determining the rotor speed reference value comprises causing the rotor speed reference unit 42 to set the rotor speed reference value to be equal to the measured rotor speed of the wind turbine rotor when it is determined that the measured rotor speed of the rotor is determined to be less than the rotor speed reference value. In this way, the controller 40 acts to prevent the determined error from causing the speed controller 46 to pitch the blades back into the wind and attempting to speed the rotor up. The controller 40 will then continue to continuously generate new rotor speed reference values in the previous manner.

Each of the above control strategies contribute to reduce the maximum rotor speed during shutdown, which in turn reduces the stress on drivetrain and gearbox components. This increases the safety of the wind turbine design and reduces the required design loads for designing the tower 10 and foundation of the wind turbine 1.

In the examples above, the invention has been described using a single wind turbine controller 40 to control the collective pitch of each of the wind turbine blades 32 of the wind turbine 1. In one embodiment, the wind turbine 1 is provided with a respective controller 40 for each of the wind turbine blades. In this way, the pitching of the three wind turbine blades 32 of a wind turbine may be individually controlled thus allowing rotor blade fatigue loads to be compensated for where there may be uneven loading on the rotor, for example the load due to the tilt and yaw moments at the main bearing of the wind turbine nacelle. Alternatively or additionally, the multiple controllers 40 may be used to provide redundancy in the control system, for example so that the remaining controllers 40 may take over in the event that one of the controllers is damaged by a lightning strike or another fault.

Figure 3:
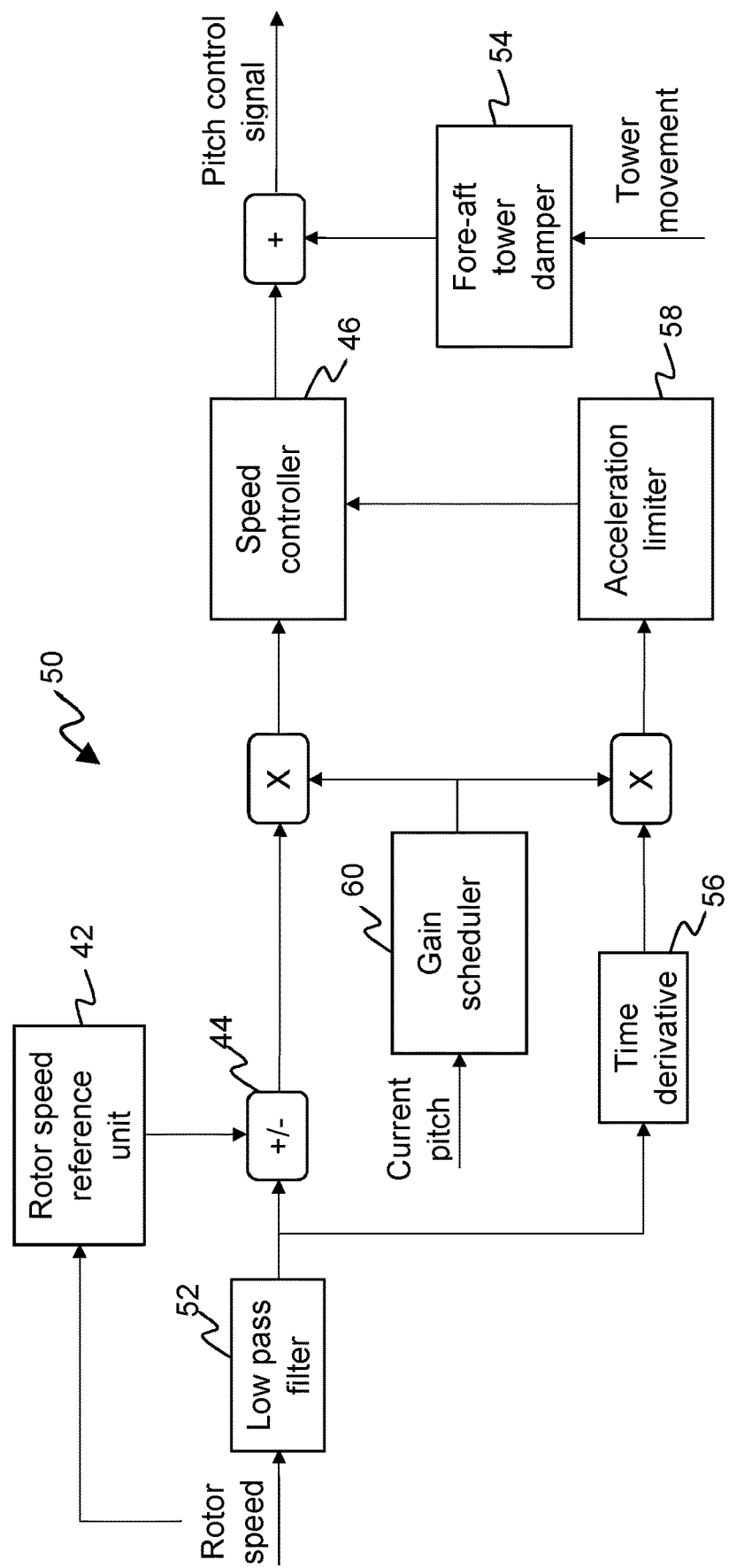
FIG. 3 is an example of a controller according to a second example of the invention.

FIG. 3 illustrates further elements of a control system that may be implemented in a wind turbine controller for controlling the shutdown of a wind turbine according to an embodiment of the invention. The wind turbine controller 50 explicitly illustrates a fore-aft tower damper 54, and also comprises a rotor speed reference unit 42, an error value controller 44 and a speed controller 46, with like reference numbers being used for like components with respect to the wind turbine controller 40. Accordingly, whilst the above description of wind turbine controller 40 will not be repeated herein, it applies equally to the corresponding components of wind turbine controller 50.

Wind turbine controller 50 further comprises a low pass filter unit 52, a fore-aft tower damper 54, a time derivative unit 56, an acceleration limiter 58, and a gain scheduler 60. It will be appreciated from the below that each of these units may be used individually, and accordingly the wind turbine controller 40 may be modified to include one or more of these additional components without including the remaining components. For example, wind turbine controller 40 may be modified to include a fore-aft tower damper 54 without the acceleration limiter 58 or the gain scheduler 60. Other combinations of these units are of course possible as will be appreciated by the person skilled in the art.

In the example of FIG. 3, the measure of the rotor speed is received at a low pass filter 52 prior to being communicated to the error value controller 44. This acts to reduce the high frequency fluctuations in the signal communicating the measured rotor speed and thus smooths the value of the rotor speed signal. In turn, this advantageously tempers the volatility of the determined error signal generated by the error value controller 44 and the pitch control signal generated by the speed controller 46 and thus reduces the strain and fatigue induced in the pitch control actuators during the shutdown procedure. The measure of the rotor speed that is received by the rotor speed reference unit 42 is shown as being received prior to the low pass filter 52; however, it will be appreciated that this input could instead be provided from the output of the low pass filter 52.

The fore-aft tower damper 54 receives a measure of the movement of the wind turbine tower 10 and causes the wind turbine controller 50 to adapt the pitch control signal accordingly. The measure of tower movement may be derived from a position sensor, a velocity sensor or an acceleration sensor as will be appreciated by the person skilled in the art.

While the fore-aft damper is illustrated in connection with the embodiment of FIG. 3, it should be understood that the disclosure of the fore-aft damper is equally relevant for the general embodiment of FIG. 2.

The adaptation to the pitch control by the fore-aft tower damper 54 is preferably proportional to the lateral (downwind) velocity at the top of the wind turbine tower 10; however, this may of course be determined from position or acceleration measurements, using differentiation or integration respectively, or a combination of position, velocity and acceleration measurements. In one example, the pitch angle may be altered in more general terms in line with the following equation, where Ka, Kv and Kp are typically real non-zero numbers corresponding to the respective acceleration, velocity and position gains used to tune the control scope of the damping of the tower movement:

Change in pitch angle=(acceleration×$K_a$)+(velocity×$K_v$)+(position×$K_p$)

In one implementation, an accelerometer may be placed on the wind turbine tower, for example at the top of the wind turbine tower, and configured to obtain a measure of the acceleration in the fore-aft (forwards and backwards) plane. This acceleration may then be converted into a velocity using a velocity estimator, such as a low pass filter that is appropriately tuned so that the resonant frequency of the tower is the region around which the low pass filter acts like a leaky integrator. However, other integrators or other sensor types may be used as described above.

In one example, the fore-aft tower damper 54 may modify the pitch control signal to reduce the rate of change of the wind turbine blade pitch in the event that the movement of the wind turbine tower 10 is determined to be into the wind, i.e. in the fore direction against the wind direction. By reducing the rate of change of pitch in this manner, the pitch angle will be comparatively low with respect to the situation if the fore-aft tower damper 54 had not modified the pitch. This lower pitch angle means that the wind turbine blades 32 will experience a greater degree of wind loading, which acts to counter the movement of the wind turbine tower 10 into the wind and therefore dampens the oscillation of the tower in the fore-aft plane. Although this may increase the speed of the rotor by comparison, the reduced wind turbine tower loads provide a trade-off that may be beneficial in the design of the wind turbine 1 as a whole.

Additionally or alternatively, the fore-aft tower damper 54 may modify the pitch control signal to increase the rate of change of the wind turbine blade pitch in the event that the movement of the wind turbine tower 10 is determined to be in the same direction as the wind direction, i.e. in the aft direction. By increasing the rate of change of pitch in this manner, the pitch angle will be comparatively high with respect to the situation if the fore-aft tower damper 54 had not modified the pitch. This higher pitch angle means that the wind turbine blades 32 will experience a lower degree of wind loading, which acts to minimise any acceleration of the wind turbine tower 10 in the wind direction due to the wind loading. Therefore, this further acts to dampen the oscillation of the wind turbine tower 10 in the fore-aft plane.

In FIG. 3, the fore-aft tower damper 54 is shown as feeding into an adder that modifies the pitch control signal of the speed controller 46. In an alternative example, the output of the fore-aft tower damper 54 may instead be fed into the rotor speed reference unit 42 and used to modify the rotor speed reference value in order to modify the resultant pitch control signal.

The example of FIG. 3 is further provided with an acceleration limiter 58 that receives the measure of the wind turbine rotor speed via a time derivative unit 56. The time derivative unit 56 will convert the measure of the wind turbine rotor speed into a measure of the acceleration of the wind turbine rotor. The time derivative unit 56 may act as a one-step derivative or use any other corresponding approach, for example lead networks or specific filters.

The acceleration limiter 58 is provided to curb extreme accelerations that may arise in the wind turbine rotor by causing the pitch control signal to be modified. As shown in FIG. 3, the acceleration limiter 58 may communicate this modification to the speed controller 46. Alternatively the modification may operate on the output of the speed controller 46, i.e. at a downstream point between the speed controller 46 and the wind turbine blade pitch actuators, in this case the output arrow from the acceleration limiter 58 in FIG. 3 would be directed to the summation point to the right of the speed controller 46 rather than to the speed controller itself. This may be by the acceleration limiter 58 providing an additional offset to the pitch control signal or by applying a given level of gain to the pitch control signal.

In one example, the acceleration limiter 58 has a dead zone between an acceleration of zero and a given threshold acceleration whereby no gain modification is applied for accelerations below the given threshold. When the acceleration is determined to be above the threshold, a proportional gain modification may be applied such that the pitch control signal, and therefore the rate of change in pitch of the wind turbine blades 32, is increased in proportion to the amount that the acceleration is above the given threshold. This proportional gain modification may be linear or non-linear.

In another example, the acceleration limiter 58 operates the dead zone such that a zero pitch control signal offset is output to be summed with the output of the speed controller 46 when the level of acceleration is determined to be below a given threshold acceleration and wherein the pitch control signal offset that it output to be summed with the output of the speed controller 46 is proportional to the amount that the acceleration is over the given threshold when the acceleration is above the given threshold.

By increasing the rate at which the wind turbine blades 32 are pitched out using the examples described above, the maximum acceleration of the wind turbine rotor is controlled during the shutdown procedure of the invention to keep the acceleration levels within acceptable boundaries. Accordingly, the acceleration limiter may preferably act to override the pitching control scheme of the rotor speed reference unit 42 and the speed controller 46 in situations where there is a large acceleration that requires a large reaction in terms of pitch control.

The acceleration limiter 58 may include a filter to smooth the value of the gain modification that is output by the acceleration limiter 58. The filter acts to prevent a sudden change in the gain modification in the event that the acceleration rapidly drops back into the dead zone where no gain modification is applied.

As shown in FIG. 3, a wind turbine controller according to the invention may also be provided with a gain scheduler 60. The gain scheduler 60 receives a measure of the current pitch angle of the wind turbine blades 32 as an input and outputs a gain control signal to scale the action of the speed controller 46 to match the various possible operating points of the wind turbine 1. The measure of the current pitch angle may be received from a pitch position sensor located on one or more of the wind turbine blades 32, with the pitch value ranging from 0 degrees to 90 degrees and the blade being fully pitched out at a pitch angle of 90 degrees.

In one implementation, the gain scheduler 60 may provide a degree of gain reduction to scale down the pitch control signal and/or the rate of change of the wind turbine blade pitch based on the measure of the current pitch of the wind turbine blade 32. This gain reduction may be applied as a linear gain reduction with the rate of gain reduction changing at a number of thresholds of the current pitch angle.

Figure 4:
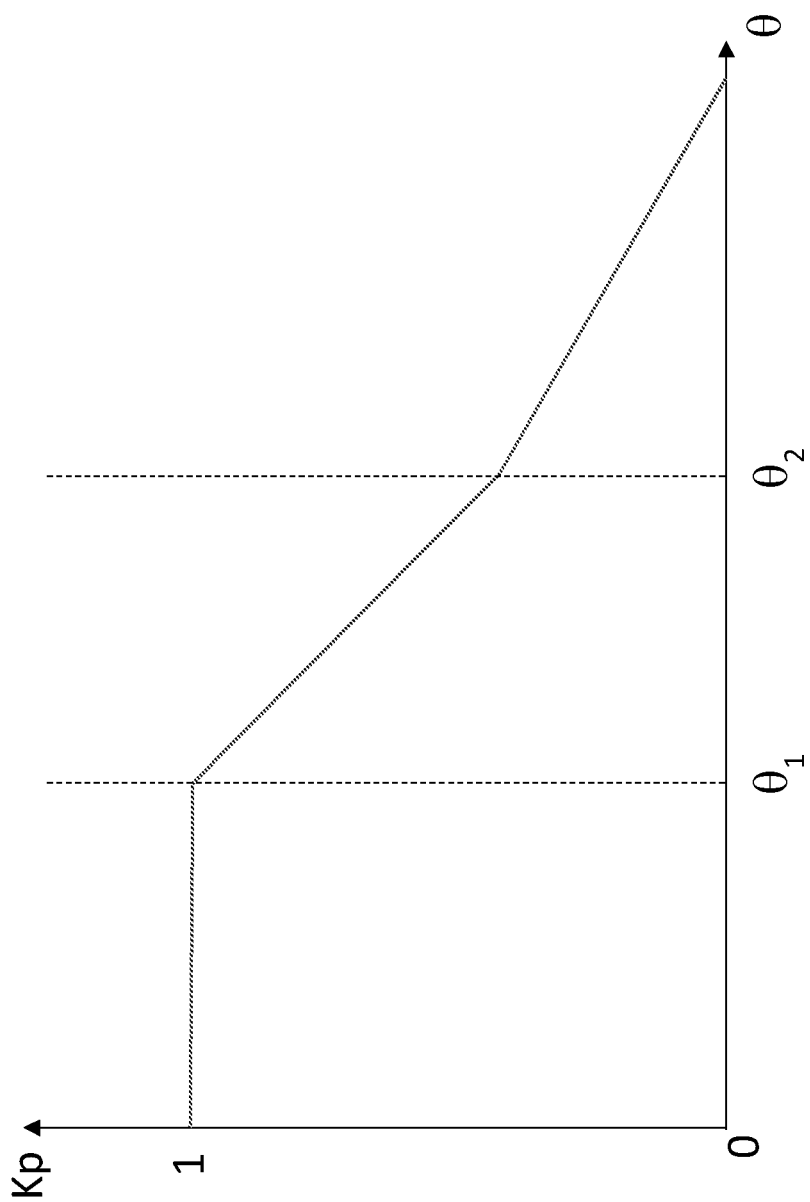
FIG. 4 is a graph illustrating a gain control regime according to the second example of the invention.

An example of such a gain reduction regime is illustrated in FIG. 4, with current wind turbine blade pitch $\Theta$ being shown on the x axes and the applied gain $K_p$ being shown on the y axes. In the first region, where the current pitch is determined to be less than a first threshold of $\Theta_1$, a gain of 1 is applied, i.e. no gain reduction. As the wind turbine blade is pitched out during the shutdown procedure, the value of $\Theta$ will increase and eventually cross the first threshold value $\Theta_1$. At this point, the amount of gain applied will fall below 1 and accordingly the gain is reduced at a first rate of change. The applied gain is then reduced at a second rate of change when the pitch value is greater than $\Theta_2$.

As can be seen from FIG. 4, in this example the first rate of change is higher than the second rate of change. This means that the aggressiveness of the pitch control regime is reduced as the pitching of the wind turbine blades 32 nears the feathered position. In one example, $\Theta_1$ may be set to approximately 10 degrees and $\Theta_2$ may be set to be approximately 30 degrees.

As described above, the shutdown procedures may be initiated by the controller in response to the controller receiving a shutdown request. In particular, the controller may receive a request for an emergency shutdown. The described shutdown procedures are particularly appropriate for emergency shutdown scenarios as the wind turbine 1 is likely to be experiencing adverse environmental conditions, such as extreme wind gusts, and the wind turbine may also have been recently disconnected from the power grid leading to a removal of the generator braking torque as set out above.

In these situations, it is especially important that the wind turbine 1 is shut down safely whilst also attempting to minimise the instantaneous loads that the components of the wind turbine 1 experience during the shutdown. As will be appreciated, the wind turbine controller 40, 50 may initiate an emergency shutdown procedure without receiving an external request for emergency shutdown in the event that the controller detects an internal failure or other condition necessitating an emergency shutdown.

The controllers, functions and logic elements described herein may be implemented as hardware components or as software executing on one or more processors located at the wind turbines or remotely. The one or more processors may comprise one or more special purpose processing devices such as an application specific integrated circuit (ASIC), a field programmable gate array (FPGA), a digital signal processor (DSP), network processor, or other similar devices. The one or more processors are configured to perform the operations and methods described above, which may be carried out by a single processor or, alternatively, may be carried out by a number of processors connected together.

The invention claimed is:

1. A method of controlling shutdown of a wind turbine having a rotor, the rotor comprising one or more wind turbine blades, the method comprising:
   dynamically determining a rotor speed reference;
   obtaining a measure of the rotor speed of the rotor and maintaining a constant rotor speed reference value when the rotor speed of a rotor is determined to be increasing;
   obtaining a measure of a fore-aft movement of a wind turbine tower;
   determining an error between the rotor speed reference and the rotor speed of the rotor; and
   controlling a pitch of one or more of the wind turbine blades based on the determined error and the measured fore-aft movement of the wind turbine tower.

2. The method according to claim 1, wherein the dynamic determination of the rotor speed reference comprises setting the rotor speed reference value to be equal to the rotor speed of the rotor when the rotor speed of the rotor is determined to be less than the rotor speed reference value.

3. The method according to claim 1, wherein the dynamic determination of the rotor speed reference comprises progressively ramping the rotor speed reference down to zero when the rotor speed of the rotor is determined to be both higher than the rotor speed reference value and to not be increasing.

4. The method according to claim 1, wherein a rate of change of the pitch is reduced whilst the wind turbine tower is determined to be moving into the wind due to the fore-aft movement and/or wherein the rate of change of the pitch is increased whilst the wind turbine tower is determined to be moving in the direction of the wind due to the fore-aft movement.

5. The method according to claim 1, wherein the dynamic determining of the rotor speed reference further comprises modifying the rotor speed reference based on the measured fore-aft movement of the wind turbine tower.

6. The method according to claim 1, further comprising determining an acceleration of the rotor based on the rotor speed of the rotor, wherein a rate of change of the pitch is increased proportional to the acceleration when the acceleration is above a given threshold.

7. The method according to claim 1, wherein a gain reduction is applied to a rate of change of the pitch as a function of the pitch of the one or more wind turbine blades.

8. The method according to claim 7, wherein the gain reduction is a progressive gain reduction and a rate of the progressive gain reduction is based on one or more threshold angles of the pitch of the one or more of the wind turbine blades.

9. The method according to claim 7, whereby no gain reduction is applied if the pitch is below a first threshold angle, a first rate of progressive gain reduction is applied if the pitch is between the first threshold angle and a second threshold angle and a second rate of progressive gain reduction is applied if the pitch is above the second threshold angle, wherein the first rate of progressive gain reduction is higher than the second rate of progressive gain reduction.

10. The method according to claim 1, wherein the pitch of each of the one or more wind turbine blades is controlled individually.

11. A controller for a wind turbine having a tower, a rotor disposed on the tower, the rotor comprising one or more wind turbine blades, wherein the controller comprises:
    a stored instruction;
    the controller configured to execute the stored instruction;
    wherein the controller, when executing the stored instruction, performs an operation comprising:
        dynamically determining a rotor speed reference, wherein the dynamic determination of the rotor speed reference comprises setting the a rotor speed reference value to be equal to a rotor speed of the rotor when the rotor speed of the rotor is determined to be less than the rotor speed reference value;
        obtaining a measure of the rotor speed of the rotor;
        obtaining a measure of a fore-aft movement of the tower;
        determining an error between the rotor speed reference and the rotor speed of the rotor; and
        controlling a pitch of the one or more of the wind turbine blades based on the determined error and the measured fore-aft movement of the tower.

12. The controller according to claim 11, wherein the controller is configured to perform the operation during shutdown.

13. A wind turbine comprising:
    a tower;
    a nacelle disposed on the tower;
    a rotor proximate the nacelle; wherein the rotor comprises one or more wind turbine blades; and at least one controller configured to perform an operation comprising:
dynamically determining a rotor speed reference and maintaining a constant rotor speed reference value when a rotor speed of the rotor is determined to be increasing;
obtaining a measure of the rotor speed of the rotor;
obtaining a measure of a fore-aft movement of the tower;
determining an error between the rotor speed reference and the rotor speed of the rotor; and
controlling a pitch of the one or more wind turbine blades based on the determined error and the measured fore-aft movement of the tower.

14. The wind turbine according to claim 13, wherein the at least one controller comprises respective controllers each configured to control the pitch of a respective wind turbine blade of the one or more wind turbine blades.

15. The wind turbine according to claim 13, wherein the at least one controller controls the pitch of each of the one or more wind turbine blades.

\* \* \* \* \*